Oct. 15, 1935.   G. T. PFLEGER   2,017,291
FLEXIBLE BELT
Filed Dec. 4, 1933
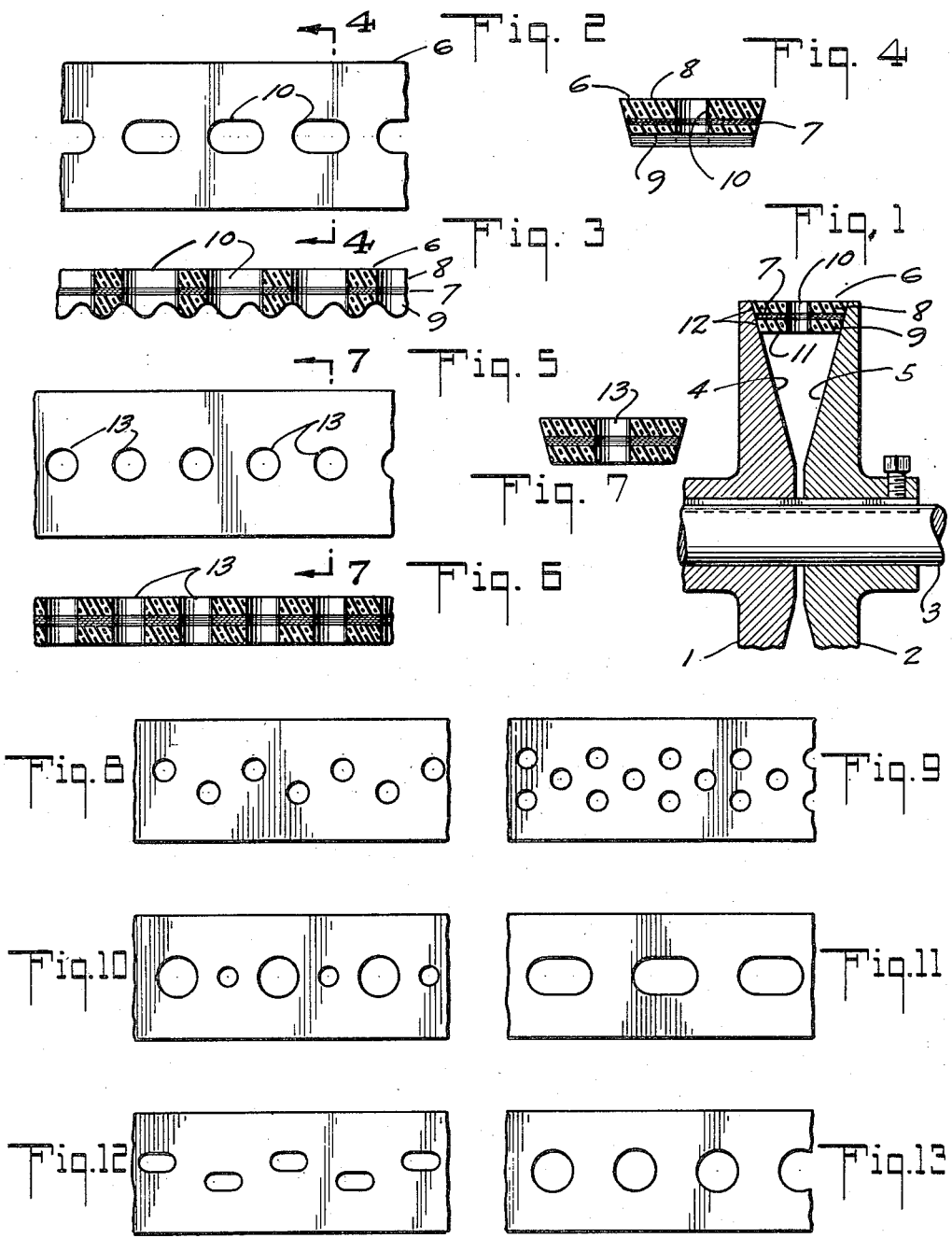
INVENTOR
George T. Pfleger
BY John Flam
ATTORNEY Patented Oct. 15, 1935

2,017,291

UNITED STATES PATENT OFFICE 2,017,291

FLEXIBLE BELT

George T. Pfleger, Los Angeles, Calif., assignor to United States Electrical Manufacturing Company, Los Angeles, Calif., a corporation of California Application December 4, 1933, Serial No. 700,868

4 Claims. (Cl. 74—233)

This invention relates to flexible belts employed for the transmission between pulleys having opposed inclined faces, engaging opposite sides of the belt.

It is one of the objects of this invention to provide a belt which has increased power transmitting capacity and a long life.

It is another object of this invention to provide a belt which can be operated at a high peripheral speed without failure of the belt.

It is still another object of this invention to provide a belt which will operate with a minimum of noise and vibration.

It is still another object of this invention to provide a belt that can readily dissipate the heat due to internal friction.

It is still another object of this invention to provide a belt in which the shearing stresses due to flexure around the pulley faces are reduced to a minimum, and very substantially below undesired values.

It is still another object of this invention to provide a belt and pulley structure of this character in which the power loss inherent in such transmission systems is greatly reduced.

It is still another object of the invention to make it possible to use such a belt effectively with pulley structures having adjustable diameters having wide limits of adjustment.

A belt of the type employed with pulleys having opposed inclined faces is subjected to a combination of many forces. That portion of the belt between the pulley faces is subject to a lateral compression force, parallel to the axis of the pulley. This is caused by the axial force produced by the initial tension in the belt, and that due to the useful load transmitted by the belt. The tangential force at the pulley face, which represents the useful load or power, is transmitted to the driving cords of the belt from these faces by the shearing strain between the driving cords and the material in which they are imbedded. For a fixed set of pulleys, the maximum useful tangential force at the pulley face is a direct function of the lateral pressure on the belt. The maximum lateral pressure which the belt can withstand without failure due to fatigue is thus a distinct factor limiting the power transmitting capacity of the belt.

The shearing stress between the driving cords of the belt and the material in which they are imbedded forms another limiting factor for the power transmitting capacity. In order to decrease the lateral pressure per unit area and the shearing stress, it becomes necessary to construct a belt, the cross section area of which is large in proportion to the area of the driving cords of the belt. An additional width of belt even greater than that required by the limiting shearing stress is desirable in order to increase the stability of the belt. A narrow belt has a tendency to twist and turn sideways in the pulleys. This results in a rapid failure due to the whipping of the belt. A slight twist in a wide belt produces a large tension strain which pulls the belt back into position.

The flexure of the belt in bending over the pulleys introduces new limiting factors. Each time a belt passes over a pulley it suffers all the strains common to a beam in bending. The exterior part of the belt is in tension, and the interior part is in compression. The part in tension suffers a lateral contraction, and the part in compression suffers a lateral expansion. This produces a shearing stress both in the direction of the belt movement and at right angles to that direction. This results in two types of failure which may occur separately or simultaneously. Thick and narrow belts fail rapidly due to the shearing stress in the longitudinal direction. This failure is characterized by a buckling and separation from the driving cords of the exterior and interior portions of the belt. Wide belts, however, are more apt to fail from the shear in the lateral direction. This shearing stress increases with the width of the belt and is a maximum at the edges of the belt. Failure from this stress is characterized by a separation at the edges of the belt, adjacent the neutral axis of the cross section of the belt. The failure rapidly progresses toward the interior of the belt, resulting in the total failure of the belt.

Failure from these shearing stresses is a function not only of the total number of reversals of stress but also of the rate at which those reversals take place. The power dissipated in the belt is a direct function of the rate of stress reversals. For a high rate of heat generation in the belt the temperature of the interior is raised to the point where the stress resisting power of the material is materially decreased. The peripheral velocity at which a belt can be operated without failure over a given set of pulley diameters is thus definitely limited.

The present invention obviates these difficulties, common to a belt of large cross section, without any sacrifice of the desirable characteristics.

These results are obtained by providing through apertures in the belt. These apertures permit the circulation of air through the belt, and between the inner and outer surfaces, since there is a clear space between the inner belt surface and the pulley structure. The apertures also function to redistribute the belt stresses in such a way as to produce the desirable characteristics noted heretofore.

This invention possesses many other advantages, and has other objects which may be made more easily apparent from a consideration of several embodiments of the invention. For this purpose there are shown a few forms in the drawing accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawing:

Figure 1 is a diagrammatic sectional view of a belt incorporating the invention, shown in conjunction with a variable pulley structure having a pair of sections with opposed inclined faces engaging opposite sides of the belt;

Fig. 2 is a fragmentary top plan view of a belt embodying the invention;

Fig. 3 is a longitudinal section thereof;

Fig. 4 is a sectional view, taken along plane 4—4 of Fig. 2;

Fig. 5 is a view similar to Fig. 2, of a modification of the belt;

Fig. 6 is a longitudinal section of the belt shown in Fig. 5;

Fig. 7 is a sectional view, taken along plane 7—7 of Fig. 5; and

Figs. 8 to 13 inclusive are views similar to Fig. 2, of modified forms of the belt.

In Fig. 1 there are shown a pair of pulley sections 1, 2 which are relatively adjustable in an axial direction, on a shaft 3 in driving relation with the sections. The sections 1, 2 have respectively the opposed inclined faces 4, 5, with which the wedge-shaped belt 6 is in driving engagement.

The belt 6 is also shown in Figs. 2, 3, and 4. It has a relatively inelastic central part 7 for carrying the useful belt tension and elastic portions 8 and 9 which can undergo respectively elongation and compression. The apertures 10 passing through the belt in a direction radial to the pulley 1—2, contribute greatly to the desirable features of the belt 6. When the belt 6 is bent over the pulley, the material 9 of the belt 6 in compression can expand laterally and longitudinally into the area of the apertures 10. Thus the opposite sides of the apertures 10 can be slightly compressed in a direction parallel to the axis of the pulley 1—2, and there is no harmful bulging of the belt adjacent its lower edge 11, which might have the effect of changing the angle of the pulley engaging sides. The strain of the material 8 in tension is also relieved by the distortion of the apertures 10, since the apertures can widen as the tension of the belt causes a lateral contraction. These apertures therefore relieve the shearing stresses due to the bending of the belt and thereby makes it possible to use thicker and wider belts without failure from fatigue. This decrease in the stresses also decreases the power dissipated by the internal friction of the belt and thereby increases the efficiency of the drive and the life of the belt.

In effect, the provision of the apertures 10, is the equivalent of having two independent belt portions, each having a single pulley face engaging surface, but joined integrally by the material between the apertures. In this way, distortion of the belt sections is permitted at a place remote from the engaging surfaces. If the belt were imperforate, the lateral forces acting transversely to the belt length would be fully transmitted from one side of the belt to the other. This would cause a building up of the lateral shearing stresses. These stresses would reach a maximum adjacent the opposite sides of the belt and at the regions 12 neighboring the relatively inelastic material 7; that is, adjacent the extremities of the neutral axis of the belt section. These stresses, in a comparatively wide belt, would soon cause failure, the inner or compression portion shearing away from the outer or tension portion.

By using the apertures 10, the building up of these stresses is reduced, as the belt section is free to distort into the area of the apertures without effectively transmitting the stresses from one side of the belt 6 to the other.

The belt disclosed herein may be made by a plurality of methods. It is well known in the art that V-type belts may be formed individually or as a drum which is subsequently cut into individual belts. In either case the belt may be formed by applying the belt materials to a substantially cylindrical mold, to which heat may be applied to cure the binding material used in the belt.

The elastic portion 9 of the belt, which is subject to compression forces, may be formed of a rubber composition having fibrous material embedded therein.

The fibrous material adds to the rigidity of the belt against lateral compression without materially decreasing the elasticity of the belt in bending around the pulley. The elastic portion 9 may also be formed of loosely woven strips of rubberized fabric embedded in rubber, which yield longitudinally during the movement of the belt over the pulley but which preferably resist lateral compression of the belt.

In molding the belt, a layer of fabric may be placed on the cylindrical mold, over which the material forming the elastic portion 9 is applied. The material forming relatively inelastic central part 7 may then be applied to the mold. The central part 7 of the belt may be formed from rubberized cord fabric which may be wound under tension around the cylindrical mold. The fabric may be pre-stretched so that most of the natural stretch is removed from the cord before it is applied to the mold. If it is desired the central part 7 may be formed of individual cords wound continuously around the cylindrical mold under tension.

The elastic portion 8 of the belt, which is subject to tension, may be formed of successive layers of rubberized bias cut fabric wound around the cylindrical mold. A layer of rubber may then be applied over the rubberized fabric, after which heat may be applied to the mold to cure the rubber or other binding material. When the belts are individually molded, pressure may be applied to the belt during the curing process.

When the belts are molded in drums, the apertures may be punched into the belts before cutting the drum into individual belts. Or if it is desired, the drum may be cut into individual belts first, after which the apertures may be punched into the belts. When the belts are molded individually, the apertures may be punched in the belt after it is removed from the mold.

If it is desired the apertures may be formed in the belt when the belt is molded. The mold may be provided with projecting pins which are properly spaced to form the apertures in the belt. The fabric and cord materials, used in the construction of the belt, are wound around the cylindrical drum on either side of the projecting pins of the mold. The portion of the belt between the successive apertures, such as 10, Figure 2, will be formed of rubber or of the binding material used in the construction of the belt. It is also possible to perforate the fabric materials, used in the construction of the belts, so that the projecting pins of the mold fit into the perforations formed in the fabric. The fabric materials may then be wound over the projecting pins. The belt produced by this method will be essentially similar to that in which the apertures are formed after the belt is molded.

It has been found particularly successful to mold the belts in drums, then cut the drums into individual belts. Apertures of the desired size and spacing then may be punched in the belt, to meet the conditions under which the belt will be operated.

While the belt has been described as consisting of a rubber and fabric composition, it is to be understood that other materials such as leather may be employed, as it is evident that the invention applies to all V-type belts formed of flexible materials.

The apertures 10 also assist in dissipating the heat generated by the internal friction in the belt. A constant stream of air is blown through the apertures by the fanning action of the belt when passing over the pulleys. The air in fact can circulate between the inner and outer belt faces, and over those portions of the pulley structure 1—2, which lie radially inside of the belt 6. This lowering of the belt temperature makes it possible to increase the peripheral velocity at which the belt can be operated without failure, and thus increase the power transmitting capacity of the belt.

The spacing and size of the apertures 10 can be so proportioned that the rigidity of the belts in lateral compression is essentially uniform throughout the length of the belt. If the apertures 10 are too large or placed too near the edge of the belt it can be detected by the hammering of the belt 6 against the pulleys. This results in a noisy operation of the belt and rapid failure. The apertures also assist to decrease the vibrations of the belts in that a wider belt can be used, which has increased stability and rigidity against lateral bending. The proportions shown in the drawing have been found effective; but some latitude in the choice of size and form and spacing of the apertures is permissible.

The apertures 10 also increase the flexibility of the belt 6 in bending around the pulley 1—2, making it possible to use thick wide belts in combination with small high speed pulleys. This results in a compact power transmission with a large power capacity.

The use of wide belts with apertures is of particular utility in combination with adjustable diameter pulleys of the character shown in Fig. 1. The minimum width of belt which can be employed with an adjustable diameter pulley is a function of angle included between faces 4, 5, and of the variation in belt diameter. If a narrow belt be employed, it is necessary to use pulleys with a small included angle, or else only a limited variation in pulley diameter is possible. A limited variation in diameter defeats the purpose of the adjustable diameter pulley, while the use of a small included pulley angle unduly increases the lateral compression on the belt, which would result in a rapid failure of the belt.

Figs. 5, 6, and 7 show a modified form of belt in which the size and spacing of the apertures 13 are somewhat different from the form just described.

Figs. 8, 9, 10, 11, 12 and 13 show further modified spacings of apertures which are of particular utility in combination with wide belts. The apertures can be made of any convenient shape providing care is taken to avoid any abrupt change in curvature which tends to concentrate stresses. The apertures may be made small and placed quite close to the edge of the belt as in Fig. 9, or fewer but larger apertures may be used as in Fig. 8, spaced farther from the edge of the belt.

I claim:

1. A flexible belt having opposed inclined pulley engaging side surfaces and top and bottom faces, said belt having apertures extending through the belt from one of the faces to the other face, said apertures being distributed throughout the length of the belt.

2. A flexible driving means having opposed inclined pulley engaging side surfaces and top and bottom faces, said driving means having apertures extending through the means from one of the faces to the other face.

3. A flexible belt having opposed inclined pulley engaging side surfaces and top and bottom faces, said belt having apertures formed therein extending substantially through the belt from one of the faces to the other face.

4. A flexible belt having opposed inclined side surfaces for engaging a pulley having opposed inclined belt engaging faces, said belt having inner and outer faces and means for passing air through the belt from the inner face to the outer face.

GEORGE T. PFLEGER.